US006382802B1

(12) United States Patent
Goodman

(10) Patent No.: US 6,382,802 B1
(45) Date of Patent: May 7, 2002

(54) PORTABLE FLOOR MIRROR

(76) Inventor: Donna M. Goodman, 10072 Knuth Cir., Villa Park, CA (US) 92861

( * ) Notice: Subject to any disclaimer, the term of this patent is extended or adjusted under 35 U.S.C. 154(b) by 0 days.

(21) Appl. No.: 09/829,606

(22) Filed: Apr. 10, 2001

Related U.S. Application Data

(60) Provisional application No. 60/196,235, filed on Apr. 10, 2000.

(51) Int. Cl.[7] .......................... G02B 5/08; G02B 7/182; A47G 1/16; B60R 1/02
(52) U.S. Cl. ....................... 359/840; 359/872; 359/881; 248/469; 248/474
(58) Field of Search ................................. 359/871, 872, 359/881, 879, 840, 865; 248/469, 472, 473, 474

(56) References Cited

U.S. PATENT DOCUMENTS

| | | | | |
|---|---|---|---|---|
| 328,739 A | * | 10/1885 | Wiederer | |
| 404,110 A | * | 5/1889 | Pincus | |
| 559,572 A | * | 5/1896 | Devoe | |
| 898,263 A | * | 9/1908 | Rice | |
| 1,179,063 A | * | 4/1916 | Aldrete | 359/879 |
| 1,206,720 A | * | 11/1916 | Lane | |
| 1,788,209 A | * | 1/1931 | Sheehan | 359/840 |
| 2,266,977 A | * | 12/1941 | Lynch | |
| 2,559,290 A | * | 7/1951 | Engelmann | 359/840 |
| 4,771,300 A | * | 9/1988 | Bryan | 359/881 |
| 5,359,461 A | * | 10/1994 | Rice et al. | 248/469 |
| 5,556,070 A | * | 9/1996 | Viebrock | 248/469 |
| 6,099,133 A | * | 8/2000 | Wright | 359/880 |

* cited by examiner

Primary Examiner—Ricky D. Shafer
(74) Attorney, Agent, or Firm—Joseph N. Breaux

(57) ABSTRACT

A portable floor mirror system for allowing an individual to set up a mirror at a desired height and desired ambient light conditions situation that includes a tripod assembly with collapsible legs that supports a mirror assembly having a two-sided rotatable mirror which includes a triple magnification mirror on one side and a one magnification power mirror on the other.

1 Claim, 3 Drawing Sheets

PORTABLE FLOOR MIRROR

This application claims the benefit of provisional application No. 60/196,235 filed Apr. 10, 2000.

TECHNICAL FIELD

The present invention relates to make-up accessories and more particularly to a portable floor mirror that includes a stand which has telescoping legs and into which a magnifying mirror assembly is insertable and adjustable to a height so that a user can apply make-up while standing and not require the use of a table or sink surface. The portable floor mirror would be sufficiently collapsible to comfortably fit into most carrying bags for easy portability.

BACKGROUND OF THE INVENTION

It is often difficult for women to apply make-up because a mirrored surface is not provided at the proper height, magnification, or under the proper lighting conditions. It would be a benefit, therefore, to have a mirror system which could be positioned by a user and then ambient light conditions situations and positioned at a desired height so that the user could advantageously use the mirror for make-up purposes. It would be a further benefit if the make-up assembly included magnification mirror and/or a lighting mechanism so that these accessories could also be utilized when applying make-up.

SUMMARY OF THE INVENTION

It is thus an object of the invention to provide a portable floor mirror which includes a two-sided mirror that is detachably connectable to a collapsible tripod base having telescopic legs and which is collapsible to a size sufficient to allow for easy portability in a carrying bag. The two-sided mirror is rotatably connectable to the tripod base and is adjustable in a variety of angles via an angle adjustment mechanism. One side of the mirror would have a three magnification power and the other side would not be magnified. A vertical support stem would be locked into position that incorporated a locking ring which would allow the user to lock the mirror assembly to the tripod base.

Accordingly, a portable floor mirror is provided. The floor mirror includes a two sided mirror that is detachably connectable to a collapsible tripod base having telescoping legs and which is collapsible to a size sufficient to allow for easy portability in a carrying bag. The two sided mirror is rotatably connectable to a tripod and is adjustable in a variety of angles and angle adjustment mechanism. One side of the mirror has a three power magnification. The other side has a normal one power magnification. A vertical support stem is lockable into position with an incorporated locking ring that allows the user to lock the mirror assembly to the tripod base.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
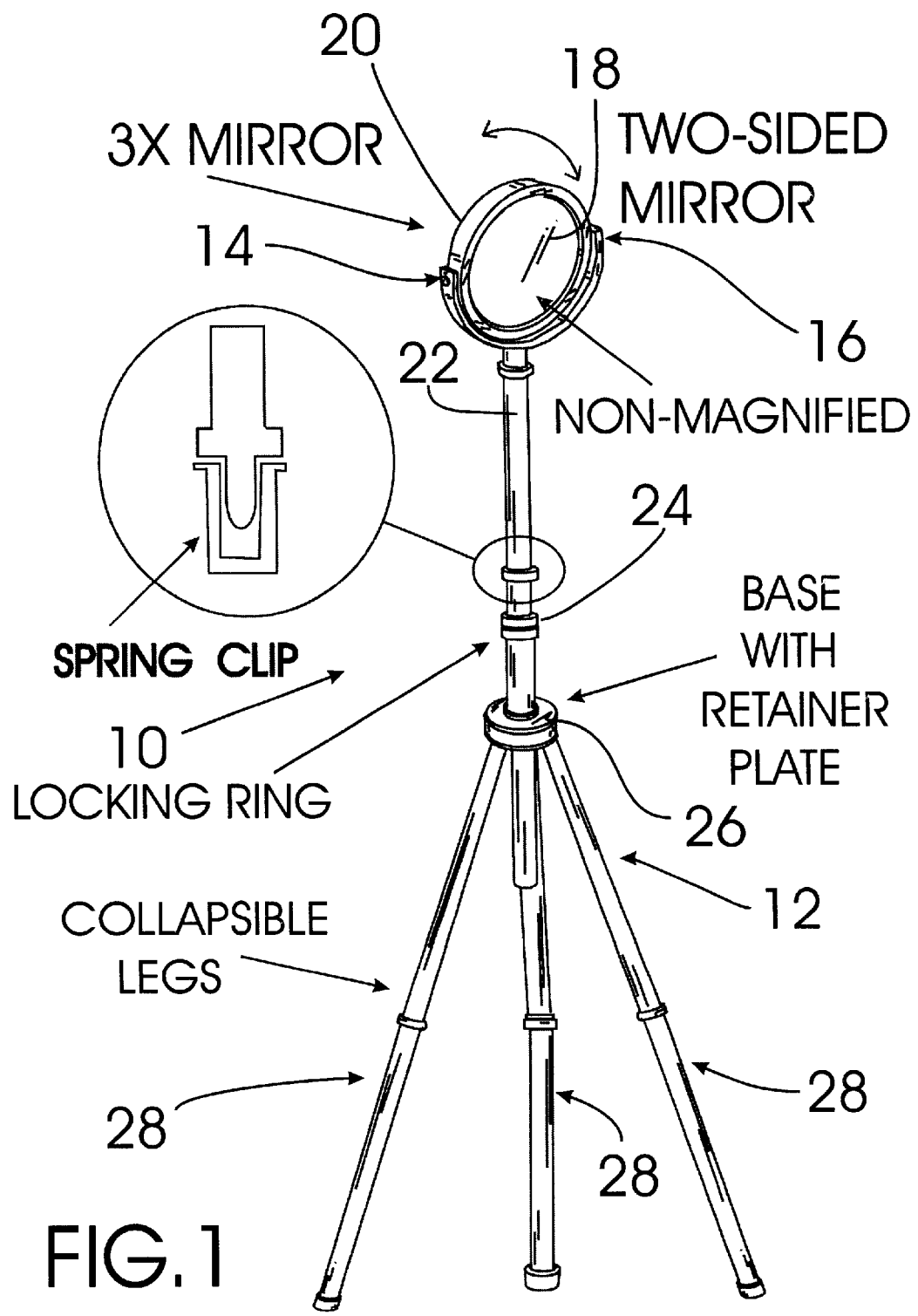
FIG. 1 is a perspective view of an exemplary embodiment of the portable floor mirror of the present invention.
Figure 2:
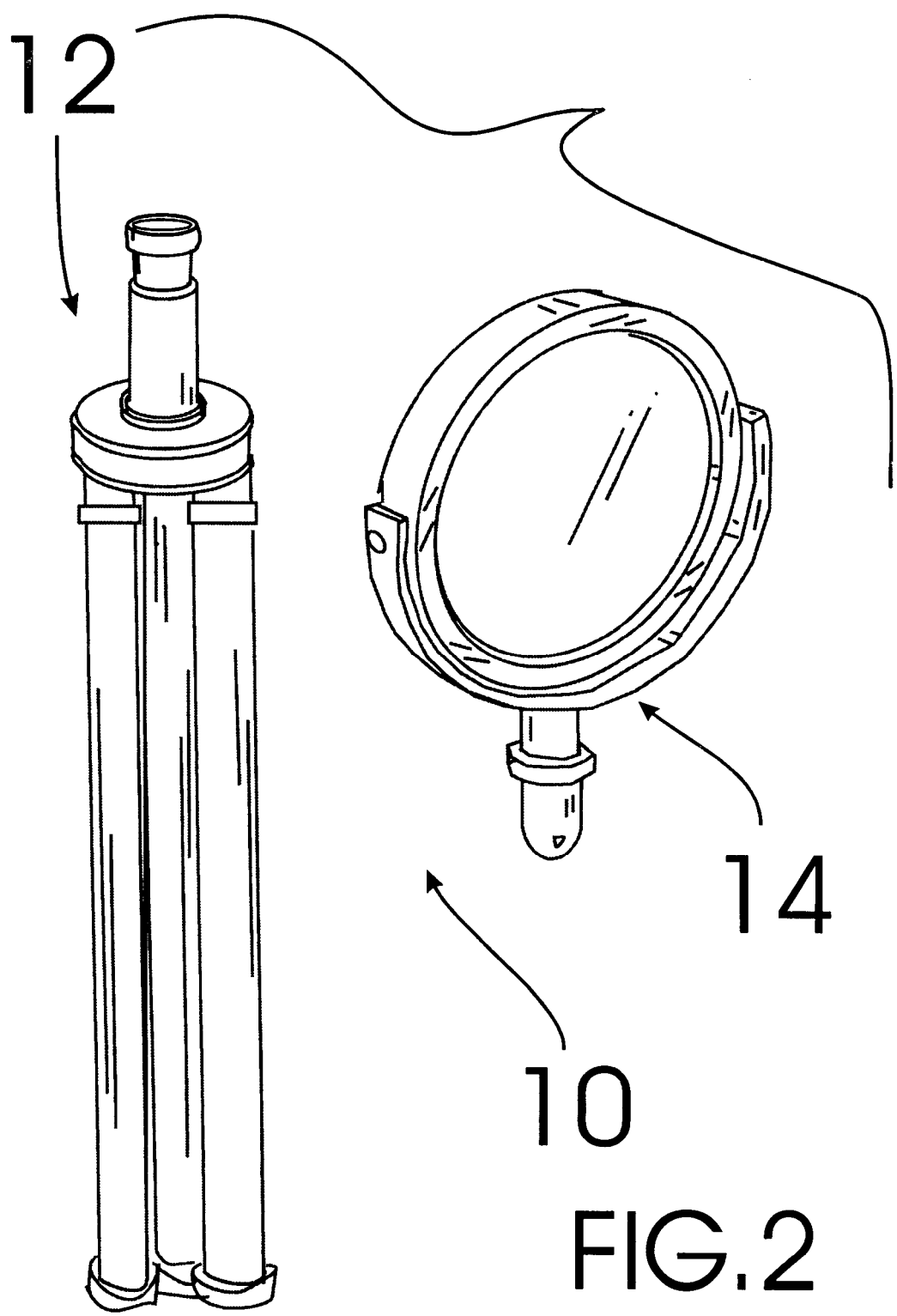
FIG. 2 is an exploded view of the portable floor mirror system of the present invention in the disassembled configuration.
Figure 3:
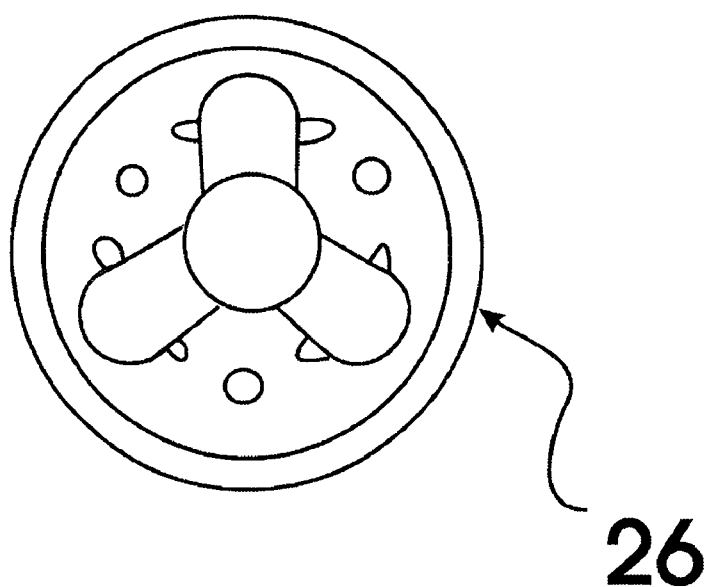
FIG. 3 is a bottom view of the base of the tripod.
Figure 4:
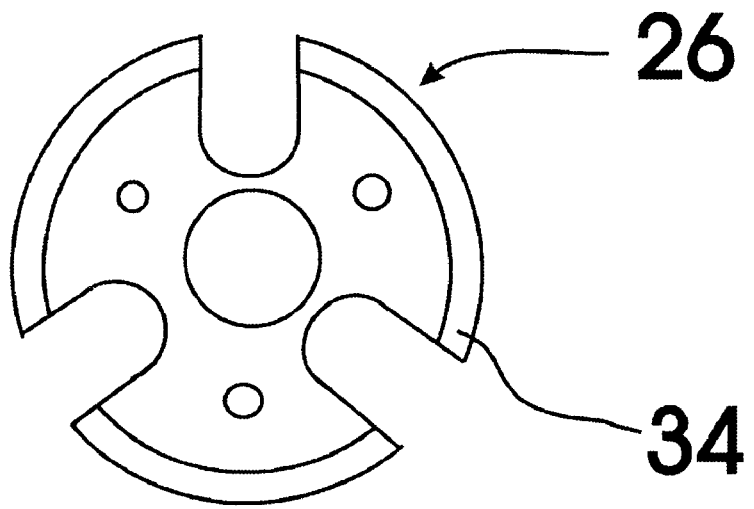
FIG. 4 is a bottom view of the retainer plate of the tripod.

FIG. 1 shows an exemplary embodiment of the two sided mirror system of the present invention generally designated 10. Mirror system 10 includes a detachably connectable tripod base 12 that is detachably connectable to a two sided mirror assembly 14. Two sided mirror assembly is rotatable by the central axis 16 and includes a non-magnified surface 18 as well as a three powered magnified surface 20. A bottom portion 22 of the mirror assembly 14 is spring clipped lockable into a locking ring 24 which is in connection with the base 26 of collapsible tripod 12. Base 26 has three collapsible legs 28 attached thereto. Each of the collapsible legs pivots with respect to base plate retainer and as shown in FIG. 2 tripod 12 when detached from mirror assembly 14 is sized sufficiently to fit into a compact storage bag for carrying. FIG. 3 shows a bottom view of the base 26. FIG. 4 shows a bottom view of a retaining plate 34 of the base assembly 26.

It can be seen from the preceding description that a portable floor mirror has been provided.

It is noted that the embodiment of the portable floor mirror described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A portable floor mirror comprising:

a carrying bag;

a collapsible tripod base being sufficiently collapsible to allow for positioning into the carrying bag;

a mirror assembly including a two sided mirror that is detachably connectable to the collapsible tripod base with a spring clip;

the collapsible tripod base having telescoping legs and a locking ring;

the two sided mirror being rotatably connectable to the tripod and adjustable in a variety of angles with respect to the tripod by an angle adjustment mechanism;

one side of the two sided mirror having a magnification and the other side of the two-sided mirror having no magnification; and the spring clip of the mirror assembly being lockable to the locking ring of the collapsible tripod base.

* * * * *